(12) United States Patent
Bradley

(10) Patent No.: US 8,303,285 B2
(45) Date of Patent: *Nov. 6, 2012

(54) SELF CURING INJECTION NOZZLE

(75) Inventor: Jeremy Bradley, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,055

(22) Filed: Mar. 3, 2011

(65) Prior Publication Data

US 2011/0146570 A1  Jun. 23, 2011

Related U.S. Application Data

(63) Continuation of application No. 11/984,427, filed on Nov. 16, 2007, now Pat. No. 7,967,587.

(30) Foreign Application Priority Data

Dec. 8, 2006 (GB) .................. 0624562.5

(51) Int. Cl.
  *B29C 45/26* (2006.01)
  *B29C 70/74* (2006.01)
(52) U.S. Cl. ....... 425/13; 249/157; 425/127; 425/174.4; 425/543; 425/547; 425/549
(58) Field of Classification Search .......... 425/13, 425/127, 174.4, 543, 547, 549; 249/155, 249/157; 264/478, 482, 496
See application file for complete search history.

(56) References Cited

U.S. PATENT DOCUMENTS

| | | |
|---|---|---|
| 1,307,486 A | 6/1919 | Deslauriers |
| 1,670,339 A | 5/1928 | Butterworth |
| 3,526,694 A | 9/1970 | Lemelson |
| 4,100,240 A | 7/1978 | Bassani |
| 4,519,974 A | 5/1985 | Bravenec et al. |
| 4,521,456 A | 6/1985 | Hanson |
| 4,971,745 A | 11/1990 | Ferenc et al. |
| 5,154,321 A | 10/1992 | Shomer |
| 5,192,560 A | 3/1993 | Umetsu et al. |
| 5,204,124 A | 4/1993 | Secretan et al. |
| 5,322,381 A | 6/1994 | Argo, II |
| 6,000,924 A | 12/1999 | Wang et al. |
| 6,797,224 B2 | 9/2004 | Pedigo et al. |
| 2004/0245677 A1 | 12/2004 | Marple et al. |
| 2007/0241478 A1 | 10/2007 | Buckley |

FOREIGN PATENT DOCUMENTS

| | | |
|---|---|---|
| EP | 1 413 416 | 4/2004 |
| FR | 2 483 333 | 12/1981 |
| FR | 2 877 239 | 5/2006 |
| JP | 8-230048 | 9/1996 |

OTHER PUBLICATIONS

European Search Report dated May 4, 2007.

*Primary Examiner* — Robert B Davis
(74) *Attorney, Agent, or Firm* — Nixon & Vanderhye P.C.

(57) ABSTRACT

An injection nozzle having a nozzle body defining an injection cavity and at least one curing device integrally formed within the nozzle body.

7 Claims, 3 Drawing Sheets

SELF CURING INJECTION NOZZLE

Figure 1:
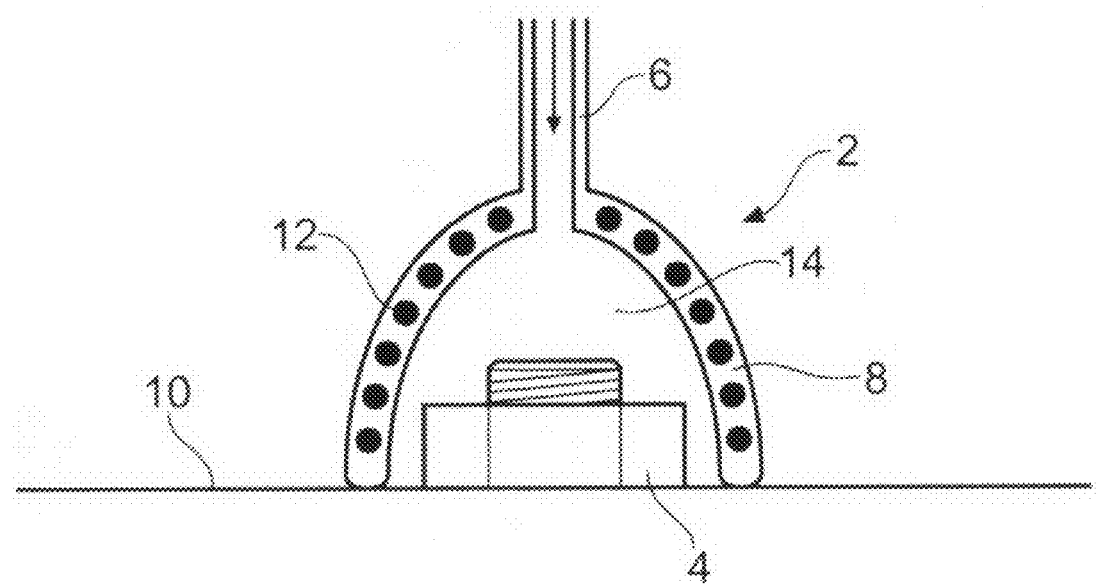

This application is a Continuation of application Ser. No. 11/984,427, filed Nov. 16, 2007, now U.S. Pat. No. 7,967,587, which claims priority to GB Application No. 0624562.5 filed 8 Dec. 2006. The entire contents of these applications are incorporated herein by reference.

The present application relates to an injection nozzle comprising an integral curing device.

During the manufacture of an aircraft, for example, it is often necessary to provide fluid-tight seals in many of the joints between components, for example to prevent fuel leakage from fuel tanks or air leakage from pressurised areas. Any fasteners, such as nuts and bolts, passing through such a boundary are typically covered with a sealant to prevent such fluid leakage through the fastener hole. Previously the sealant used would simply be allowed to cure (set) naturally by exposure to either the moisture in the atmosphere or atmospheric ultraviolet radiation. Alternatively, a curing agent was added to the basic sealant immediately prior to use, the curing agent causing a chemical reaction to occur that cured the sealant. To speed up the curing process resin and sealant systems were developed that make use of an external energy input to trigger the curing action of the sealant. Typical examples are cured by irradiation with ultraviolet light. This use of external energy to trigger the curing action is typically referred to as "cure on demand" technology.

Within the aerospace industry, the application of a sealant coating over a fastener is typically carried out manually. In a first method the sealant is extruded around the fastener using a sealant gun and is manually tooled into shape using a spatula or similar tool. Alternatively, a nozzle, typically bell or cup shaped, is fitted to the sealant gun and is placed over the fastener, after which the appropriate quantity of sealant is directly injected onto the fastener. After the sealant has been shaped or the injection nozzle removed the sealant is subjected to an appropriate external energy input to initiate the curing process. However, there are limitations with these current methods due to the fact that is difficult to automate the process. Trials with automated injection nozzles have not been successful since the sealant does not break cleanly when the injection nozzle is removed. This causes strings of sealant to be dragged across the work piece, resulting in unnecessary mess.

Embodiments of the present invention provide an injection nozzle that substantially mitigates the above problems.

According to a first aspect of the present invention there is provided an injection nozzle for encapsulating a component, such as a fastener, in situ, the injection nozzle comprising a nozzle body defining an injection cavity and at least one curing device integrally formed with the nozzle body.

The integration of a curing device with the nozzle body itself allows a sealant to be injected over a fastener and subsequently cured before removing the injection nozzle, thus avoiding strings of uncured sealant being dragged across a work piece.

The curing device may comprise of one or more heating elements or one or more light sources, or a combination of both. Where the curing device is a light source, it preferably comprises an LED, such as an ultraviolet or infrared LED. Alternatively, the light source may comprise one or more fibre optic cables arranged to transmit light from an external light source to within the injection cavity.

In further embodiments, the nozzle body may comprise a plurality of movable nozzle portions that are arranged to be reversibly moved with respect to each other between at least a first configuration in which the injection cavity has a first volume and a second configuration in which the injection cavity has a second different volume. By such a provision the volume of the injection cavity can be varied to suit differing sizes of fasteners.

The movable nozzle portions may comprise a plurality of concentric elements arranged to be linearly transposed with respect to one another along a common central axis. Alternatively the movable nozzle portions may comprise a plurality of overlapping nozzle leafs arranged to be rotatably transposed with respect to one another about a central axis.

Figure 2:
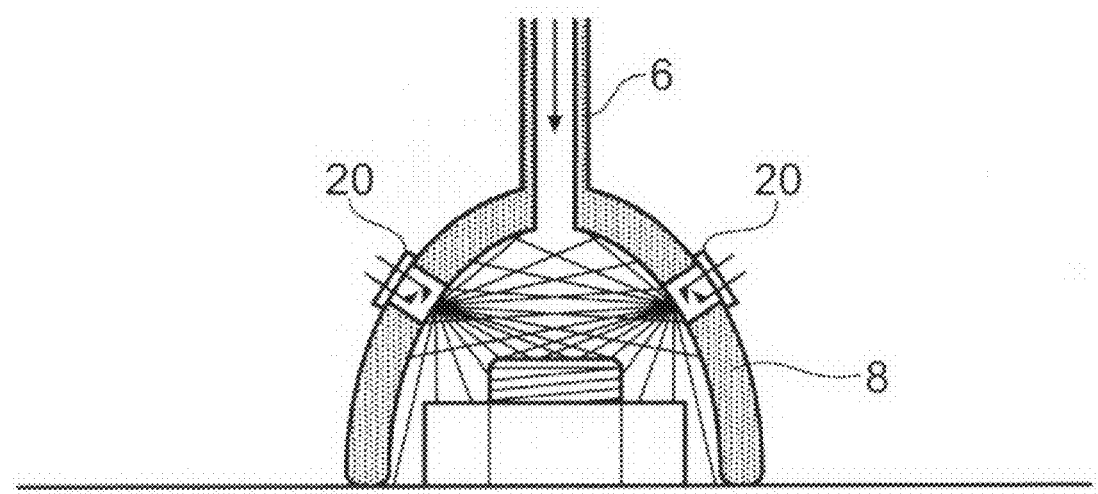
Figure 3:
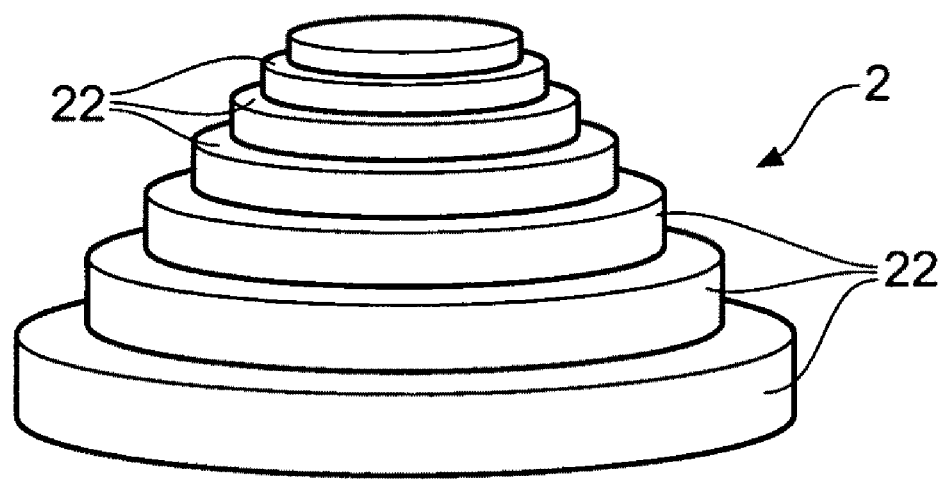
Figure 5:
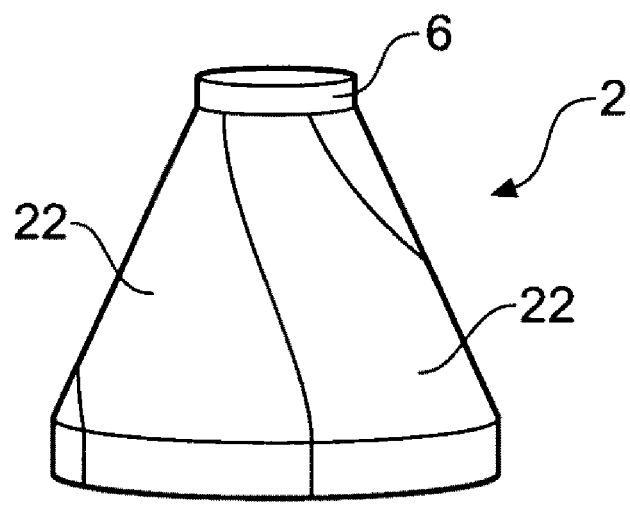
Figure 4:
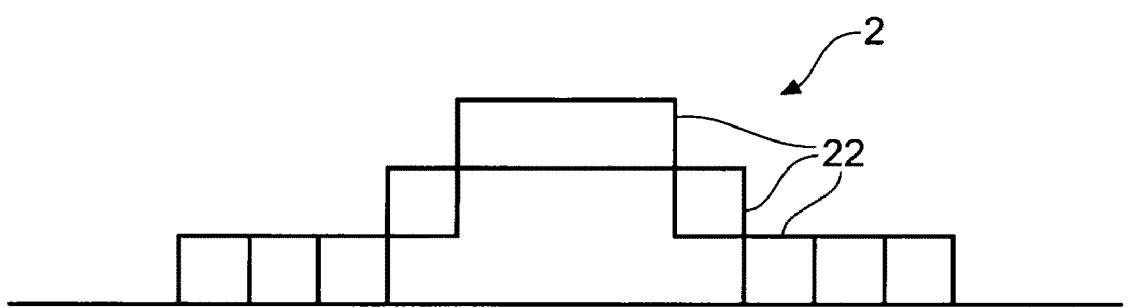

Embodiments of the present invention are described below in further detail, by way of illustrative example only, with reference to the accompanying figures, of which:

FIG. 1 schematically illustrates in cross section a first embodiment of an injection nozzle according to the present invention encompassing a heating element in situ over a fastener;

FIG. 2 schematically illustrates in cross section a further embodiment of the present invention encompassing a plurality of LEDs in situ over a fastener;

FIG. 3 schematically illustrates a further embodiment of the present invention having an adjustable volume nozzle body utilising concentric nozzle portions;

FIG. 4 schematically illustrates the embodiment of FIG. 3 in a second configuration; and FIG. 5 schematically illustrates a further embodiment of the present invention having a nozzle body of variable volume utilising rotatable Overlapping nozzle leafs.

It will be appreciated that although the term sealant is used exclusively in this application other injectable substances may equally be used, depending on the desired use. Therefore the term 'sealant' is defined within the context of this application to encompass all such substances.

FIG. 1 schematically illustrates an injection nozzle according to a first embodiment of the present invention. The nozzle 2 is shown in situ placed over fastening bolt 4. Nozzle 2 includes a sealant inlet tract 6 that when in use is in communication with a supply of sealant. The nozzle further includes a nozzle body 8 that in the embodiment illustrated is substantially cup or bell shaped, with the peripheral edge of the nozzle being arranged to be pressed in a sealing engagement with the surface of a work piece 10. To facilitate the sealing of the nozzle to the work piece the nozzle body, or at least the peripheral edge thereof, is preferably made from a resilient material, such as rubber. Embedded within the material of the nozzle body are a plurality of heating elements 12 that jointly comprise a curing device. The heating elements 12 are preferably resistive elements fed with an appropriate supply current provided by an external power supply (not shown). In use, the nozzle body is placed over the fastener, as illustrated in FIG. 1, and an appropriate quantity of sealant is injected into the nozzle cavity 14 via the sealant inlet tract 6 so as to completely encapsulate the protruding portion of the fastener 4. Whilst the nozzle is still in situ, the heating elements 12 are activated to provide an appropriate level of thermal energy to cause the sealant to cure whilst the injection nozzle remains in place. Only when the thermal elements 12 have been activated for a sufficient period of time for the sealant to be fully cured is the injection nozzle removed, thus leaving the fastener 4 completely over-coated by a cured quantity of sealant. To facilitate the removal of the nozzle from the cured sealant the nozzle body 8 is preferably made from an appropriate material that is easily released from the cured sealant. This is likely to vary depending upon the sealant to be used. Alternatively, an appropriate easy release coating may be applied to the interior surface of the injection nozzle 8.

FIG. 2 schematically illustrates in cross section an alternative embodiment of the injection nozzle shown in FIG. 1 according to the present invention. As in FIG. 1, the nozzle shown in FIG. 2 comprises an inlet tract 6 and a nozzle body 8. However, in the embodiment shown in FIG. 2 the curing device comprises a plurality of light emitting diodes (LEDs) 20. Each LED is embedded within the nozzle body as such that when activated they provide a source of illumination within the internal cavity 14 of the injection body 8. The LEDs preferably provide irradiation within the ultraviolet or infrared region of the electromagnetic spectrum, although other types of irradiation may equally be provided. A sealant that is cured by means of irradiation is used in conjunction with the injection nozzle of the kind illustrated in FIG. 2. It will be appreciated that other light sources other than LEDs may be provided as the curing device whilst remaining within the scope of embodiments of the present invention. For example, the individual LEDs 20 of the embodiment shown in FIG. 2 may be replaced by one or more fibre optic cables that are remotely connected to an external light source. Furthermore, alternative arrangements of curing devices are possible, including, for example, providing a plurality of hot air passages within the walls of the nozzle body 8 to allow heated air to be circulated and thus heat the interior of the nozzle cavity 14. It will also be appreciated that although the nozzle body will generally be substantially circular in profile, so as to provide an approximate matching shape to commonly used fastening elements, any appropriate shape that is most suitable for use with a particular fastening element may be used, such as a square nozzle, for example.

To accommodate different sizes of fasteners without unnecessary wastage of sealant when used with smaller fasteners, in further embodiments of the present invention the size, and thus volume, of the nozzle body can be varied. FIG. 3 illustrates the variable volume) nozzle body of an injection nozzle according to such an embodiment of the present invention. The nozzle body 2 comprises a number of individual nozzle portions 22 that are concentrically arranged within one another. For example, each nozzle portion may comprise a circular ring, each ring being nested within an adjacent outer ring and being linearly movable with respect to one another. To provide an injection nozzle body of the maximum available peripheral diameter and volume all of the annular nozzle portions would be linearly extended with respect to one another to form a stepped dome-shaped nozzle cavity, as illustrated in FIG. 3. However, where only an injection cavity of reduced volume is required, for example where the fastener is of a smaller size, then only a subset of the individual nozzle body portions need to be linearly extended. An example of a partially extended nozzle body of the kind shown in FIG. 3 is schematically illustrated in FIG. 4, where only two of the inner most nozzle portions have been extended to create an injection cavity of reduced volume. Although not shown in FIG. 3 or 4, suitable flanges, or other appropriate arrangements, may be provided on each of the individual nozzle portions to limit the extent of their movement with respect to one another. Whilst the embodiment illustrated in FIG. 3 includes nozzle portions that are circular in shape, any other shape may be utilised as required.

An alternative embodiment of the present invention having a nozzle body of variable volume is illustrated in FIG. 5. In FIG. 5 the nozzle body 2 again comprises a number of individual nozzle portions. However, in the arrangement illustrated in FIG. 5 each individual nozzle portion 22 extends from the sealant injection duct 6 to the peripheral edge of the nozzle body and are arranged to be rotatably moved with respect to one another, each nozzle portion overlapping with an adjacent nozzle portion. The nozzle portions are arranged such that as they are rotatably transposed with respect to one another the circumference of the sealing edge of the nozzle body is varied, thus varying the volume of the injection cavity. Whilst the exact nature of the mechanical arrangement of the overlapping nozzle portions is not a subject of this current application and is considered within the scope of knowledge of the person skilled in the art, one possible arrangement would be analogous to that of the overlapping diaphragm blades of a camera iris. It will be appreciated that for the embodiments illustrated in FIGS. 3 to 5 that have a variable nozzle body, the integral curing device elements are arranged within individual nozzle portions in such a manner so as to avoid any obstruction of the movement of the individual nozzle portions.

The invention claimed is:

1. An injection nozzle for encapsulating a component in sealant, said component located on a workpiece, the injection nozzle comprising a nozzle body defining an injection cavity and at least one sealant curing device integrally formed within the nozzle body, said nozzle body including a peripheral edge, said peripheral edge configured to be manually pressed in sealing engagement with said workpiece, wherein said peripheral edge is made of a resilient material, and a part of the nozzle body other than said peripheral edge is made of a less resilient material than said peripheral edge.

2. An injection nozzle according to claim 1 wherein the sealant curing device comprises at least one heating element.

3. An injection nozzle according to claim 1, wherein the sealant curing device comprises at least one light source.

4. An injection nozzle according to claim 3, wherein the light source comprises an LED.

5. An injection nozzle according to claim 3, wherein the light source comprises a fibre optic cable.

6. An injection nozzle according to claim 1, wherein the resilient material is rubber.

7. An injection nozzle for encapsulating a component in sealant, said component located on a workpiece, the injection nozzle comprising a nozzle body defining an injection cavity and at least one sealant curing device integrally formed within the nozzle body, said nozzle body including a peripheral edge, said peripheral edge configured to be manually pressed in sealing engagement with said workpiece, wherein said peripheral edge is made of a resilient material, and a part of the nozzle body other than said peripheral edge is made of a non-resilient material.

* * * * *